May 14, 1968

T. F. PHILLIPS ET AL 3,382,928

APPARATUS FOR USE IN MEASURING THE
PRESSURE OF FLUIDS IN WELLS

Filed Aug. 4, 1966

TRAVIS F. PHILLIPS and
ARNOLD GLEN EDWARDS
INVENTORS.

BY Burns, Doane, Benedict, Swecker
and Mathis
ATTORNEYS

FIG.5  FIG.6

TRAVIS F. PHILLIPS and ARNOLD GLEN EDWARDS
INVENTORS.

BY Burns, Doane, Benedict, Swecker and Mathis
ATTORNEYS

FIG. 7 FIG. 8 FIG. 9

TRAVIS F. PHILLIPS and
ARNOLD GLEN EDWARDS
INVENTORS.

BY Burns, Doane, Benedict,
Swecker and Mathis
ATTORNEYS

United States Patent Office 3,382,928
Patented May 14, 1968

3,382,928
APPARATUS FOR USE IN MEASURING THE
PRESSURE OF FLUIDS IN WELLS
Travis F. Phillips and Arnold G. Edwards, Duncan, Okla.,
assignors to Halliburton Company, Duncan, Okla., a
corporation of Delaware
Filed Aug. 4, 1966, Ser. No. 570,367
7 Claims. (Cl. 166—145)

This invention relates to apparatus for use in measuring the pressure of fluids in wells. In particular it relates to apparatus which are employed to measure the pressure of closed-in or trapped formation fluids which have entered a well bore.

The evaluation of wells to test their potential productivity entails the manipulation of testing tools. These testing tools are designed to measure the flow and pressure characteristics of fluid emanating from formations intersected by well bores.

The intersected formations generally are several hundred or several thousand feet removed from a well head. This remoteness of the test site from the well head, coupled with the cumbersome nature of conduit strings which support testing devices within a well bore at test sites, have traditionally created problems with respect to maintaining proper control over a formation evaluation. In addition, these factors have often rendered uncertain or difficult the effecting of desired phases of a testing operation.

A prime difficulty has resided in being able to reliably detect at a well head the precise posture of the components of a testing tool.

It is an object of the present invention to provide an improved well testing tool characterized by apparatus which enhances the reliability of and control over well formation testing operation.

It is a specific object of the invention to provide such apparatus which provide mechanically responsive indications at a well head of the commencement and termination of certain valve movements.

It is likewise an object of the invention to provide such apparatus characterized by a mechanical securing device for a testing tool valve which provides an indication at a well head of the position of this valve, as well as another valve operator which itself may be a valve and which induces movement of the secured valve.

It is also an object of the invention to provide an improved structure for a valve securing device which is characterized by overall simplicity, operational reliability, and ruggedness.

Yet another object of the invention is to provide a testing tool which is multi-valved and wherein the selective operation of tool valves may be effected in response to axial movement of a conduit string supporting the testing device.

It is a similar object of the invention to provide such improved apparatus which enable testing operations to be repeated as often as desired merely in response to axial movement of a conduit string, with each conduit string movement providing an indication at the well head of the position of the testing tool components.

It is also an object of the invention to provide an improved structural arrangement for a well valve which enables the valve to be mechanically moved to one position, with well pressure thereafter serving to maintain or secure this position.

An apparatus for accomplishing at least some of the foregoing objectives comprises body means, valve operating means mounted for axial movement in the body means, and valve means mounted for axial movement in the body means. Connecting means between the valve operating means and the valve means allow limited axial movement of the valve operating means in response to an axial force exerted thereon, followed by concurrent axial movement of the valve operating means and the valve means in response to continued application of axial force to the valve operating means. This combination further includes and is characterized by yieldable detent means releasably securing the valve means to the body means.

Particularly significant advantages of the invention are derived when the valve operating means itself comprises a valve means, separate from the releasably secured valve means.

Still further advantages of the invention are attributable to the specific structure of the yieldable detent means which is characterized by a plurality of abutment carrying webs and a slotted sleeve insert. The abutment carrying web cooperates to define a generally slotted, sleeve-type structure occupying minimal space within the well tool and circumscribing the insert.

Other advantages of the invention are derived from the above-described combinations utilized in the context of an overall system including fluid coupling means disposed between conduit means supporting the body means and the valve operating means. This fluid coupling means is desired to hydraulically resist movement of the valve means for a selected portion of its movement. An additional facet of this combination resides in the utilization of extension joint means between the body means and packer means. The packer means is disposed beneath the extension joint means in a well bore such that the extension joint means provides an axially extensible coupling between the body means and the well engaged packer means.

Still further advantages of the invention are derived from the specific structure of the above-noted connecting means which is characterized by a neck-like member telescopingly secured to the valve operating member. When the valve means is releasably secured, and the valve operating means has reached its uppermost travel position as limited by engagement with the neck structure, the valve operating means, when functioning as an independent valve means, has moved to a closed valve position.

In describing the invention, reference will be made to a preferred embodiment illustrated in the accompanying drawings.

*Principal components of the apparatus*

Figures 1, 2:
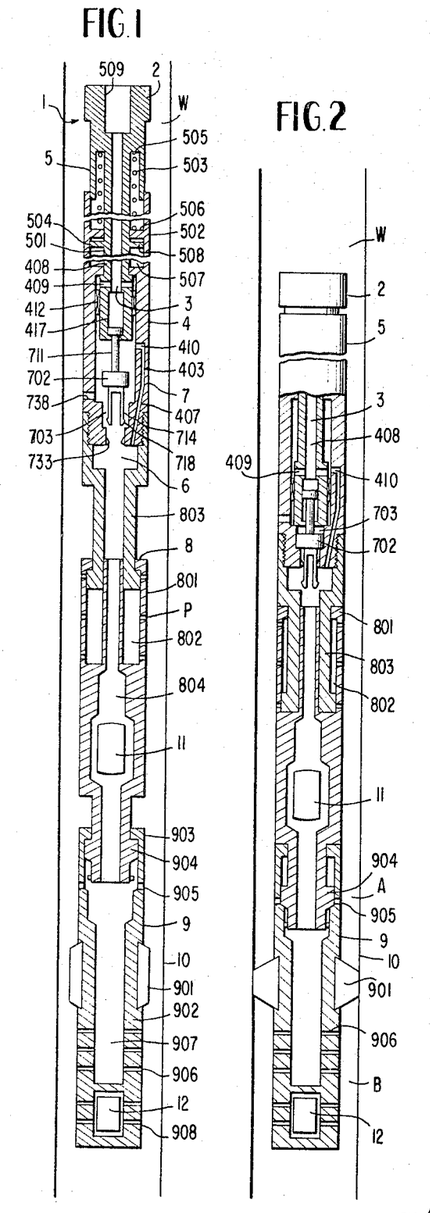
FIGURE 1 schematically represents an assembly of elements adapted to be supported on a conduit string in a well bore and to be utilized to obtain and retrieve a formation sample and record the pressures of this sample fluid. The elements of the combination are schematically shown in FIGURE 1 in the general posture which they would maintain while the apparatus was being lowered into a well bore.
FIGURE 2 schematically illustrates the combination of FIGURE 1 after a packer portion of the combination has been engaged with a well bore periphery to define a sealed annular zone above the packer and illustrates the elements of the combination thus disposed to allow a flow of formation fluid from beneath the expanded packer, through the interior of the tool, and into the interior of a supporting conduit string.

FIGURE 1 schematically illustrates an assembly to be utilized in well testing operations. This assembly or apparatus 1 may be employed to measure the pressure of formation fluids under either flowing or entrapped conditions.

Apparatus 1 includes a coupling portion 2 at its upper end. Coupling portion 2 may be threaded or provided with other conventional fastening means for securing the apparatus 1 to the lower end of a conventional conduit string. Thus, the apparatus 1 may be supported on the lower end of a conduit string and moved axially down and up within a well bore.

Apparatus 1 additionally includes a well fluid transmitting passage 3 and an axially slidable spool-type valve 4. Valve 4 serves to selectively place the passage 3 either in communicating or isolated relation with respect to well fluids in response to axial movement of the valve 4. This axial movement is induced by corresponding axial movement of the conduit string which supports the apparatus 1 and extends upwardly to a well head.

As shown in FIGURES 1 through 6, passage 3 and valve 4 correspond in general structure and function to passage 27 and the tester valve featured in the United States Schwegman Patent 2,740,479.

Figure 5:
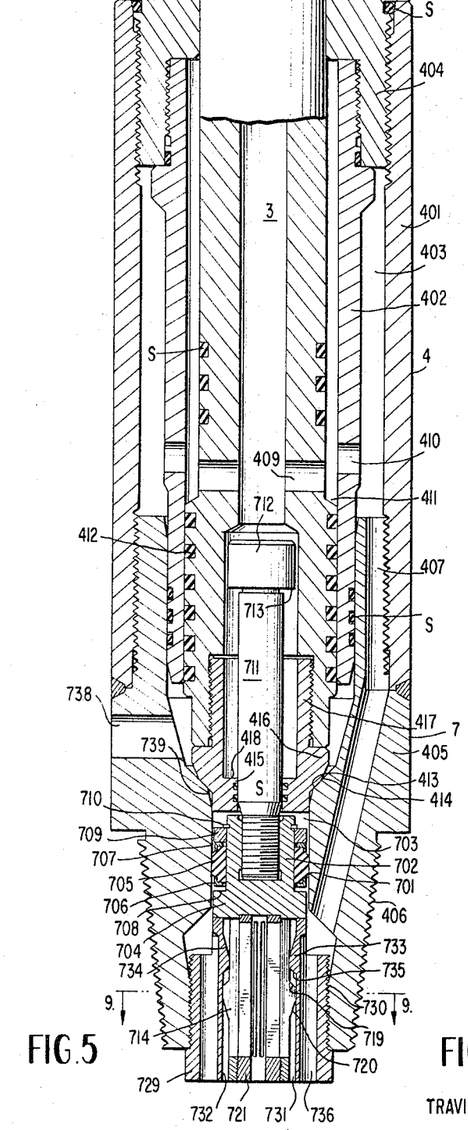
FIGURE 5 is an enlarged, vertically sectioned, fragmentary view of a portion of the FIGURE 1 assembly illustrating structural details of the well fluid flow controlling valves of the assembly, and illustrates these components disposed to allow an axial flow of well fluids from beneath a packer and axially through the tool while sealing annular zones disposed above and beneath such a packer from each other.
Figure 6:
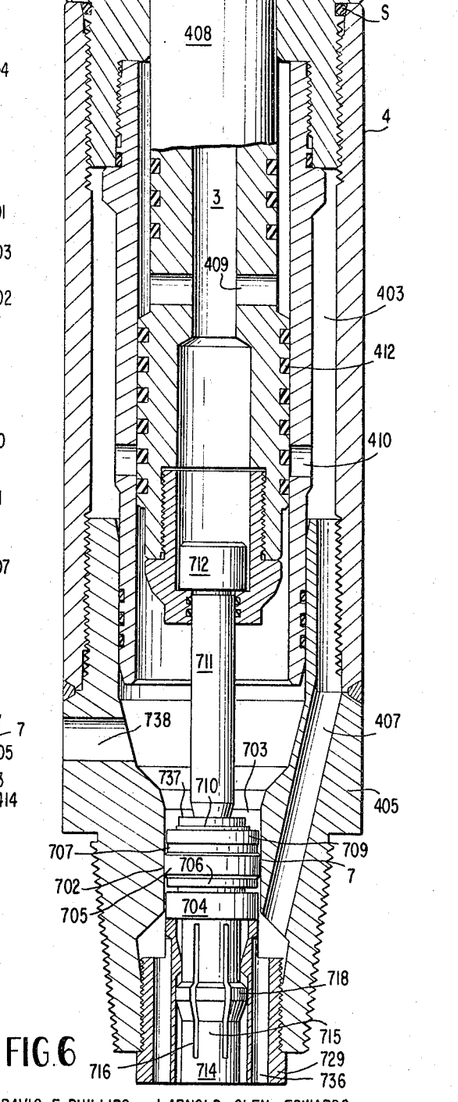
FIGURE 6 illustrates the components of the FIGURE 5 valving arrangement disposed so as to prevent axial flow through the apparatus.

The valve 4 is characterized by a cylindrical housing 401 and a sleeve 402 spaced inwardly of housing 401 to define an annular space 403. As illustrated in FIGURES 5 and 6, cylindrical housing 401 and sleeve 402 may be threadably supported on a male and female threaded coupling 404 so as to define a closed upper end for the chamber 403. A coupling fitting 405 may be threadably secured to a female threaded lower end of the housing 401 and telescopingly and sealingly engage the outer periphery of the lower end of the sleeve 402 so as to define a closed lower end for the annular space 403. A conventional, tapered, threaded male coupling pin 406 serves to connect the valve 4 with the remainder of the apparatus 1.

One or more elbow-like, generally tubular passages 407 formed in the fitting 406 provide fluid communication between the annular space 403 and the interior of the apparatus 1 beneath the valve 4, which communication is continuously effective.

A spool-like valve stem and body 408 is connected to and defines an extension of a mandrel component of a movement control device such as that featured in the United States Schwegman Patent 2,740,479. This mandrel, as described in the Schwegman patent, is connected to the conduit string which supports the apparatus 1 and is axially movable in response to axial movement of this conduit string.

Valve stem 408 includes one or more radially extending passages 409 which communicate with the central flow passage 3 which is formed in the stem 408.

One or more radial passages 410 are formed in the sleeve 402 so as to provide fluid communication with the annular housing cavity 403. When the stem 408 is positioned as shown in FIGURE 5, passages 410 also provide fluid communication with central flow passage 3 by way of the stem passages or ports 409. As illustrated, an annular recess may be formed in the outer periphery of the stem 408 so as to provide an annular passage 411 providing fluid communication between the ports 410 and 409 when they are generally aligned in the same elevation. As illustrated, the axial extent of the annular recess 411 will allow the radial ports 409 and 410 to be in fluid communication, some axial misalignment notwithstanding.

Conventional O-ring type elastomeric seals 412 carried on the outer periphery of the stem 408 below the passage 411 enable the stem to cooperate with the sleeve 402 and provide a spool-valve type of action. Thus, when the stem 408 is moved upwardly as shown in FIGURE 6 so that at least some of the O-rings or gaskets 412 disposed beneath the annular recess 411 are interposed between the ports 409 and 410, fluid flow from the annulus 403 into the central passage 3 is prevented. Conversely, when the stem 408 is disposed in the lower position of FIGURE 5, fluid may readily flow from the annular passage 403 into the central stem passage 3.

As in the case of the structure shown in the aforesaid Schwegman patent, the valve stem 408 is provided with a generally frustoconical abutment 413. Abutment 413 is adapted to abuttingly engage a frustoconical shoulder 414 formed in the fitting 406. The abutting engagement of the shoulders 413 and 414 defines the lowermost travel limit of the valve stem 408 and additionally defines a position of the valve stem 408 which ensures fluid communicating alignment of the ports 409 and 410. Upward movement of stem 408 is limited by the structure of a movement regulating device 5 connected with the valve 4 as generally described in the Schwegman patent and subsequently, herein reviewed.

Axially movable operating means 5 are superposed above and connected with the valve 4. This operating means is connected through coupling 2 with the supporting conduit string previously noted but not illustrated.

Operating means 5 may desirably comprise a movement control device such as that described in United States Schwegman Patent No. 2,740,479. The basic elements of this mechanism comprise a stem 501 (which defines a continuation of stem 408), a housing 502 which defines a continuation of housing 402, and which telescopingly receives the stem 501, coil spring 503 and hydraulic, movement impeding device 504. As is described in the Schwegman patent, stem 501 is splined to housing 502 so that rotary force may be transmitted from the apparatus supporting conduit string, through means 5, to other portions of the apparatus.

As schematically shown in FIGURE 1 and as described fully in the Schwegman patent, the coil spring 503 engages at its upper and lower ends abutment surfaces 505 and 506. These surfaces are connected to the housing 502 and the stem 501 as shown so as to impede downward telescoping movement of the stem 501 relative to a stationary housing 502.

Movement control mechanism 504, as schematically shown in FIGURE 1 and as fully illustrated and described in the Schwegman patent, comprises an arrangement of restricted flow passages, check valve means and bypass ports which causes the stem 501 to undergo initial downward movement relative to the housing 502 against a counteracting, impeding force. This counteracting force results from a restriction to flow of hydraulic fluid within a cavity 507 provided by an annular barrier 508 carried by the stem 501. This barrier contains restricted flow passages which impede the ability of the barrier 508 to displace fluid within the cavity 507 from the top to the bottom of the barrier as the stem moves downwardly. As described in the Schwegman patent, a bypass arrangement enables this hydraulic fluid to bypass the flow restricting barrier 508 after the stem 501 has moved down a predetermined axial distance. Thus, during a terminal portion of the downward axial travel of the stem 501, the stem moves without the above noted impeding action. Check valve means described in the Schwegman patent enable unimpeded upward movement of the stem 501.

The point where the impeding action of the movement control mechanism 504 is discontinued is selected so as to coincide with a point just before the valve 4 has moved sufficiently downwardly to place the ports 409 and 410 in fluid communication, i.e., place the valve 4 in an open condition.

When the valve 4 has moved downwardly to this open position, an operator of the tool at a well head will note a difference in the force required to cause downward movement of the conduit string engaged with the stem 501. In this manner, a positive well head indication is provided of the state of operation of the valve 4.

Passage means 6 provide a flow path for well fluids within the apparatus. Passage means 6 extends generally axially of the apparatus and includes passage 3, an extension of which is defined by an axial passage 509 in the stem 501. This passage 509 communicates with the interior of an apparatus supporting conduit string. Passage means 6 additionally includes a series of passages and ports to be hereinafter described which, when the valve 4 is in the open valve position, provide a generally continuous flow path extending axially through most of the length of the apparatus shown in FIGURE 1.

Apparatus 1 additionally includes an axially reciprocable valve 7. Valve 7 is disposed immediately beneath the valve 4 and serves to control fluid communication between upper and lower sides of a packer structure to be hereinafter described. Valve 4 serves as a mechanical, movement inducing, valve operating means for valve 7.

Valve 7, as shown in FIGURES 5 through 9, includes a generally cylindrical, valving, cylinder wall 701 formed in the fitting 406. A valve plug 702 is reciprocably disposed within the plug fitting 406 so as to be telescopingly movable into and out of closing relation with respect to the central passage 703 defined by the cylinder wall 701.

Valve plug 702 includes a plug body 704 supporting on its outer periphery an annular gasket member 705. Gasket 705 may be supported against peripheral distortion or extrusion by corner rings 706 and 707. An annular abutment shoulder 708 and a retaining ring 709 secured by a conventional snap ring 710 may serve to secure the gasket 705 on the plug 702 in the general manner shown in FIGURE 5. A neck-like member 711 is threadably connected to the valve plug body 704 and projects axially upwardly from the valve plug 702 into the passage 3 of the valve stem 408, as shown in FIGURES 5 and 6. Neck 711 includes an enlarged upper end or knob 712 which provides an annular abutment shoulder 713 facing generally downwardly when the apparatus is disposed in a well bore. Rod-like neck 711 passes telescopingly through a central aperture 415 formed in the lower end of the valve stem 408. As illustrated, aperture 415 may be formed in a cap-like member 416 which is threadably secured to and defines an integral portion of the lower end of the stem 408.

Cap 416 has an inner cylindrical wall 417 which is radially spaced from the stem 711 and terminates at an annular, abutment defining, shoulder 418. Abutment shoulder 418, as will be subsequently described, is axially engageable with stem shoulder 713.

Figures 7, 8, 9:
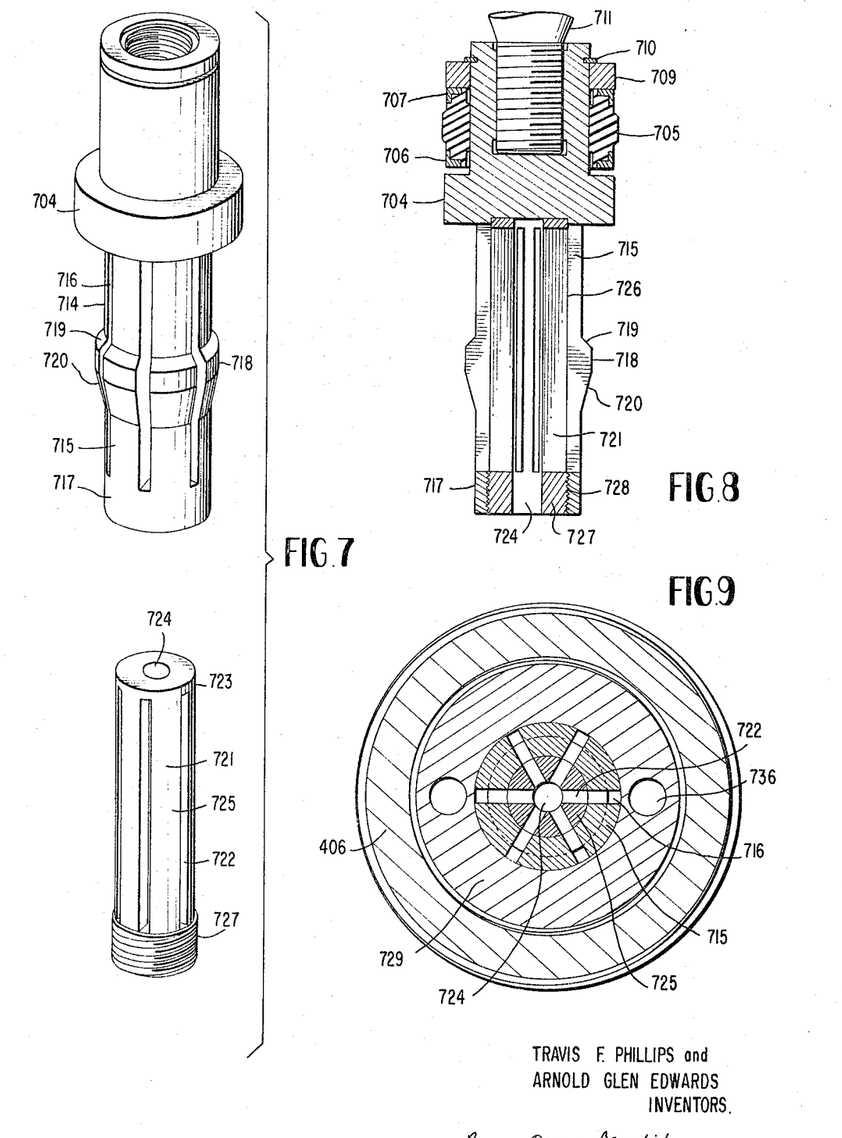
FIGURE 7 is a perspective view illustrating a sleeve and insert component of a valve securing component of the FIGURE 5 assembly.
FIGURE 8 provides a vertically sectioned view of the upper of the two components shown in FIGURE 7.
FIGURE 9 is an enlarged transverse view of the valve securing assembly of FIGURE 5 as viewed along the section line 9—9.

Plug member 702 may include as an integral and downwardly depending portion, a generally cylindrical slotted sleeve structure 714. Sleeve structure 714, which is fabricated preferably from metallic material such as steel so as to be radially resilient, includes a plurality of circumferentially spaced, peripherally arcuate, web-like segments 715 which are interspersed with generally radially extending slots 716. A continuous, ring-like, lower end 717 of the sleeve 714 closes the lower ends of the slots 716 and connects the lower ends of the webs 715. Each web 715 as shown in FIGURES 7 and 8 carries, on an intermediate portion of its outer periphery, a generally convex abutment 718. Each abutment 718 as shown in FIGURES 7 and 8 includes an uppermost, downwardly and outwardly sloping camming shoulder 719 and a lowermost, upwardly and outwardly sloping camming shoulder 720. By virtue of the radially resilient character of each web 715, its associated abutment is radially and elastically yieldable.

A sleeve reinforcing insert 721 may be provided, the structure of which is generally shown in FIGURES 7 and 9. Insert 721 comprises a generally cylindrical member formed of elastic, yieldable metal such as steel. Sleeve 721 is provided with a plurality of radially extending slots 722 which are adapted to radially align with slots 716, as shown in FIGURE 9. Slots 722 terminate at upper and lower rims 723 and 724, respectively, of insert 721.

Insert 721 includes a central aperture 724. Aperture 724 cooperates with radial slots 722 so as to form a plurality of reinforcing webs or fingers 725 which are adapted to be radially aligned with webs 715 of the sleeve 714. As illustrated in FIGURE 9, fingers 725 may be generally triangular in cross-section and cooperate with adjacent webs 718 so as to define a multi-component, generally triangular cross-sectioned, deflectable web structure yieldably and elastically resisting inward movement of the abutments 718. By providing an insert with appropriately dimensional fingers 725, the resistance to deflection of the wells 715 may be appropriately adjusted.

The outer periphery of cylindrical insert 721 is telescopingly and snugly received within a central passage 726 of slotted sleeve 714. Insert 721 may be provided with a slightly enlarged externally threaded lower end 727 which threadably engages a threaded aperture 728 of the lower end 717 of the slotted sleeve 714. Insert 714 may be secured in the position of alignment shown in FIGURE 9 by properly gauging the length of the insert 721 in relation to the length of the interior of the slotted sleeve 714 or by other conventional arrangements such as the use of set screws, etc.

An externally threaded fitment 729 is secured in a threaded aperture 730 at the lower end of valve fitting 405, as generally shown in FIGURES 5 and 6.

Fitment 729 includes a central passage 731 intended to telescopingly receive the slotted sleeve 721. Projecting radially inwardly into passage 731 from an inner wall 732 of fitment 729 is an annular abutment defining shoulder or ring 733. Shoulder 733 includes an upwardly disposed and downwardly and inwardly converging frustoconical camming shoulder 734 and a lowermost disposed but upwardly and inwardly converging camming shoulder 735. As illustrated, the slope of camming shoulder 735 is steeper than the slope of camming shoulder 734. Similarly, the slope of camming shoulder 719 exceeds the slope of camming shoulders 720.

As sleeve 721 moves upwardly through passage 731 from the position shown in FIGURES 5 and 6, the abutments 719 are brought into camming engagement with the frustoconical camming shoulder 735. The abrupt or steep nature of the surfaces 735 and 719 provides a maximized resistance to continued movement of the insert 721. Several hundred or several thousand pounds of upward axial force may be required to force the insert 721 upwardly so as to move the abutments 718 axially past the abutment ring 733.

Similarly, when the insert 721 is disposed with the abutments 718 above the ring 733, a substantial axial force is required to move the insert 721 downwardly sufficient to move the abutments 718 past the ring 733. However, owing to the relatively gradual slope of the camming surfaces 734 and 720, less force is required to move the abutments 718 downwardly past the ring 733 than is required to move the abutments 718 upwardly past this ring.

As will be appreciated, the elastically yieldable character of the webs 715 and 725 automatically restores the abutments 718 to their normal position, illustrated in the application drawings, from the radially inwardly deflected position which these abutments assume when passing the ring 733.

Fitment 729, as shown in FIGURES 5 and 6, is provided with one or more longitudinally extending passages 736 which provide communication between the passage means 6 beneath the valve 7 and the passage 407 of the fitting 405.

The axial length of rod or neck member 711 is selected to ensure that when the slotted sleeve 721 is disposed as shown in FIGURES 5 and 6, i.e., yieldably secured against upward movement, the abutment 418 will engage the abutment 713 when the ports 409 have been effectively longitudinally displaced from the ports 410 such that the valve 4 is closed. With the abutments 418 and 713 axially engaged, an increase in lifting force on the stem 408, and thus on the conduit supporting the stem 408, will be necessary in order to continue upward movement of the valve stem 408. This increase in lifting force which may entail several thousand pounds is detectable at a well head. Once the abutments 718 have moved upwardly sufficient to clear the ring 733 a measurable decrease of force required to continue upward movement of the valve stem 408 will be detected at the well head.

Similarly, with insert 721 disposed such that the abutments 718 are located above the ring 733, downward movement of the stem 408 may be continued at a certain level of downward applied force. When the valve stem 408 has been moved downwardly sufficient to bring the lower end 419 of the stem 408 into abutting engagement with the upper end 737 of the valve plug 702, an increase in downwardly imposed force will be required to move the insert 721 downwardly sufficient to cause the abutments 718 to pass the ring 733. Once the abutments have been moved past the ring 733, less downward force will be required to continue an additional downward movement of insert 721.

As will thus be appreciated, the slotted sleeve 714 and the insert 721 provide a securing arrangement for releasably securing the valve plug 702 in the passage 703. The force necessary to release the sleeve 721 from the passage 703, or induce movement of the insert 714 into passage 703, provides at the well head a positive indication of the position of the valve plug 702 in relation to the flow passage 703. In addition, the anchoring sleeve 714, when secured within the pasage 703 provides a mechanism for determining at the well head when the valve stem 408 has been moved upwardly sufficient to close the valve 4. This indication of course results from being able to detect the increase in force necessary to continue upward movement of the valve stem once the abutments 713 and 418 have been brought into engagement, as shown in FIGURE 6.

Valve 7 is designed to selectively provide fluid communication between the passage means extending axially through the apparatus 1, including the passage 3 of the valve 4 and the area of a well annulus adjacent the valves 7 and 4.

To this end, the fitting 405 is provided with one or more radially extending passages 738 which communicate with the passage 703 when the valve plug 702 has been moved upwardly out of valving engagement with the valve cylinder wall 701. Each passage 738 is completely independent of and sealed from the elbow-like passage (or passages) 407.

It will be understood that under normal operating conditions annulus pressure will exceed the pressure of well fluids flowing axially into and/or through the apparatus 1. It will also be understood that fluids providing this annulus pressure are isolated from the formation fluids passing through the tool by conventional packing means to be hereinafter described, which are carried at the lower end of the apparatus 1. This packer means is expanded to provide this isolation effect when the pressure of formation fluids are being measured.

It thus will be appreciated that, with the piston-like valve plug 702 disposed within the passage 703 as shown in FIGURES 5 and 6, annulus fluid adjacent the ports 738 will be transmitted through the ports or passages 738 and act upon the top of the plug 702. This annulus pressure will tend to move the valve plug 702 further downwardly into passage 703 until the lower end of the plug 702 seats on or engages the upper end of the threaded fitting 729.

Thus, during downward movement of the stem 408, when the valve 702 is in an elevated position not received within the passage 703 the valve 702 may be initially suspended or supported from the stem 408 by engagement of the neck abutment 713 with the stem abutment 418. As the suspended plug 702 is lowered with the lowering stem 408, the lower end of the plug 702 will engage the frustoconical, cam-like mouth or entry 739 of the opening 703. The lower end of the plug 702 will be cammed or guided by the passage opening 739 into the cylindrical portion of the pasage 703. Continued downward movement of the stem 408 will bring the lower end of the stem 408 into engagement with the top of the plug 702. With the stem thus engaged with the plug 702, further downward movement of the stem 408 will serve to mechanically force the plug 702 into fully received relation within the passage 703 so as to positively close the passage 703. During this portion of the passage closing operation, annulus fluid pressure transmitted through the passage or port 738 will act on the top of the plug 702 to assist in the passage closing by tending to bias the plug 702 further downwardly into the passage 703.

With the plug 702 disposed so as to close the passage 703, the interior fluid passages of the tool beneath the plug 702 are isolated from the pressure of annulus fluid above packer means of the apparatus 1, to be subsequently described in detail. This packer means of course is located beneath the ports 738.

In order to re-establish fluid communication between the well annulus above the packer means and the fluid passages within the apparatus 1, it is merely necessary to move the plug 702 upwardly out of passage closing relation with respect to the passage 703. This is accomplished by raising the stem 408 so as to bring the stem abutment 418 into lifting engagement with the neck abutment 713. With these abutments thus engaged, continued lifting of the stem 408 will serve to raise the valve plug 702 out of valving engagement with the passage 703.

It will be appreciated, of course, that the above-described manipulations of the plug 702 in response to the mechanical movements of the stem 408 involve the imposition of forces necessary to move the abutments 718 past the ring 733. Thus, during downward or seating movement of the plug 702, it is necessary for the stem 408 to exert sufficient force on the top of the plug 702 so as to cause the abutments 718 to be forced downwardly past the ring 733 so that the plug 702 is then disposed in an abutment secured passage closing posture. Conversely, during the upward movement or valve opening movement of the plug 702 it is necessary for the stem to exert sufficient force to move the abutment 718 past the ring 733.

When the valve is being moved either upwardly or downwardly past ring 733 the operators at the well head will be able to detect an abrupt initial increase in force necessary to be imposed on the conduit string supporting the stem 408 required to move the abutments 718 past the ring 733. As soon as the abutments 718 have moved on relative to the ring 733 sufficient to engage the camming surface on the upstroke side of the ring, an abrupt decrease in force required to continue movement of the stem 408 will be detectable at the well head.

To provide improved well head control over the manipulation of the apparatus, the point where the impeding action of mechanism 504 is discontinued may be located so that this action ceases just before the plug 702 is snapped past the ring 733. As will be appreciated by reference to FIGURES 5 and 6, plug 702 is snapped past the ring 733 just before the ports 409 and 410 are moved into communicating alignment.

Apparatus 1 additionally includes axially extensible coupling means 8. Coupling means 8, as schematically shown in FIGURE 1, may comprise a lower portion 801 which defines a generally annular and upwardly opening recess 802. This recess telescopingly receives and retains (by appropriate and conventional abutment means) an upper, generally cylindrical member 803. As illustrated, member 803 is connected with the threaded pin connector 405 of valve means 7 and 4.

Apparatus 1 also includes, at its lower end, a combination packer and valve mechanism 9.

Mechanism 9, as schematically shown in FIGURE 1, may comprise conventional and commercially available composite mechanisms utilized to grippingly and sealingly engage a well bore periphery. Such mechanisms conventionally include elastomeric, annular seal units such as the schematically shown unit 901. This unit may be expanded radially from a contracted position shown in FIGURE 1 to the configuration shown in FIGURE 2 where the element sealingly engages the periphery 10 of a well W.

As will be understood by those skilled in the oil tool art, the radial expansion and contraction of the packer 901 results from appropriate manipulations of the conduit string supporting the apparatus. Such manipulations are usually made possible by the incorporation of drag shoes or drag springs on the housing 902 of the packer assembly 9. Such drag shoes or drag springs, being conventional in character, are not illustrated. It will be understood, however, that they engage the well wall 10 so as to provide a resistance to downward movement of some of the actuating components of the mechanism 9 which serve to induce radial expansion or contraction of the packer element 901 in response to axial movement of the apparatus supporting conduit string.

The packer and valve assembly 9 may also include a generally cylindrical and radially ported, upper portion 903 which telescopingly receives an inner, generally cylindrical valving member 904. As will be hereinafter described, member 904 may be moved down from the position shown in FIGURE 1 so as to close ports 905 in the housing 903. In a conventional fashion, a J-slot, lug and slot interconnection may be provided between the telescoping valving members 904 and 903. This J-slot permits axial movement of the member 904 relative to the member 903 only after the conduit string has been rotated a predetermined extent from a locked position. During such rotation, the drag shoes or drag springs on the housing 902 prevent movement of the valving member 903.

The J-slot connection, in the usual fashion, may comprise a slot carried by one of the elements 904 or 903 and a lug slidably disposed within this slot and carried by the other of these interconnected elements. The slot of this connection would usually include a generally laterally extending section which communicates with a vertically extending section. While the lug is disposed in the horizontal section, rotational but not vertical movement between the elements 903 and 904 is possible. When the lug is disposed in the vertical section of the slot axial but not rotational movement between these elements is possible.

As shown in FIGURE 1, the axially extensible coupling means 8 is disposed in the apparatus 1 between the packer and valving assembly 9 and the valving mechanism 4 associated with the sample chamber 3.

The apparatus schematically shown in FIGURE 1 includes a conventional well fluid pressure recorder 11 disposed in an axial passage 804 of the axially extensible coupling means 8. Passage 804, as shown, comprises a portion of axial passage means 6.

Communication between a formation being evaluated and the passage means 6 may be provided by one or more radial ports 906 in the packer assembly 9. These ports, which are disposed beneath the packer element 901, communicate with a central passage 907 of the packer assembly 9, which passage also forms a portion of the overall passage means 6.

The apparatus may also include a second, conventional well fluid pressure recorder 12 carried in the lower end of the apparatus 1 as schematically shown. One or more ports 908 may provide communication between well fluids and the recorder 12.

It will be understood, of course, that ports 906 and 908, in being disposed beneath the packer 901, communicate with fluid flowing from a formation beneath the expanded packer element 901 and through an annular well space B beneath this expanded packer upwardly to the packer assembly.

*Mode of operation of tool*

In describing the mode of operation of the overall apparatus 1, reference will be made to the schematic showing of the apparatus components provided by FIGURES 1 through 4.

FIGURE 1 illustrates the apparatus 1 with its elements arranged as they would be disposed as the apparatus 1 is being lowered into a well bore. During this lowering process, the valvable ports 905 and 738 remain open. Thus, fluid may circulate freely through the portion of the passage means 6 between the valve ports 905 and 738 during the lowering operation so as to minimize the resistance to lowering imposed by fluids within the well.

During the running-in or lowering phase, the stem 501 is raised to its uppermost position relative to the housing 502, the valve 4 is disposed so as to close the passage 3, the valve 4, and the upper element 803 of the coupling 8 is in its raised position relative to component 801 of this coupling.

As shown in FIGURE 1, during the running in position of the apparatus 1, the valve stem 408 is disposed in its uppermost, valve closing position. In this position, item 408 supports the plug 702 out of valving relation with respect to the cylindrical wall 701.

Rotation of the interconnected stem 501 and valve 4 relative to the interconnected housings 502 and 401 is prevented by conventional spline connections, as previously noted. Polygonal cross sectional configurations of mating, telescoping portions 803 and 801 of the coupling means 8, as later noted, prevent relative rotation of these elements of the apparatus.

As will thus be appreciated, with the non-rotational relationship between elements above described, torque may be transmitted from an apparatus supporting conduit string to the operating means 5 and from this operating means to the valving member 904 of the packer and valve assembly 9.

FIGURE 2 schematically illustrates the arrangement of components of the apparatus 1 after the packer 901 has been expanded into sealing engagement with the well periphery. In the arrangement shown in FIGURE 2, the expansion of the packer 901 and associated well wall gripping elements, not shown, into engagement with the well wall 10 has immobilized the housing 902 of the packer and valving assembly and thus immobilized the lower end of the apparatus 1 relative to the well bore. This immobilization would be achieved by well known manipulations of the conduit string supporting the apparatus which would serve to set the packer elements of the assembly 9 in a conventional fashion.

With the apparatus disposed as shown in FIGURE 2, it defines an upper annular space A within the well and above the packer 901 and a lower annular space B within the well, beneath the packer 901, and disposed between the well wall 10 and the outer periphery of the apparatus 1.

FIGURE 2 also illustrates the apparatus components after the apparatus supporting conduit has been moved downwardly a sufficient distance relative to the anchored and set packer assembly 9 so as to depress the valve stem 408 relative to the housing 401 to an open valve position and allow flow through the passage 3, and close the ports 738.

As will be recalled, the opening of the valve 4 in response to downward movement of the stem 408 and the closing of the ports 738 results from the downward movement of the stem 408. This downward movement first induces the plug 702 to move into the passage 703 to effect its closing and then opens the valve 4 by placing the ports 409 and 410 in communicating relation.

The movement controlling mechanism 504 is disposed relative to the valve 4 so that the movement impeding force provided by this mechanism ceases when the valve stem 408 has moved downwardly to an open valve position shown in FIGURE 2. The cessation of this movement impeding force will, of course, be discernible at the well head inasmuch as a reduced downward force will be required to induce further downward movement of the conduit string supporting the apparatus. Thus, an operator will be able to determine at the well head when the conduit string has been moved downwardly to an extent sufficient to open the passage 3. This mode of utilization of the mechanism 504 is more fully described in the previously noted Schwegman Patent No. 2,740,479.

As has been previously noted, the signal provided by the cessation of the movement impeding effect of the mechanism 504 will be followed by a discernment at the well head of an increase in force required to continue downward movement of the stem 408 by moving the plug 702 into its secured position within the passage 703. As will thus be appreciated, with these changes in force discernible at the well head, an operator will be readily able to assure himself that the valve means 7 has been closed and the valve 4 opened by downward movement of the conduit string supporting the apparatus 1.

The downward movement of the conduit string 2 will have moved the upper member 803 of the telescoping coupling downwardly into the recess 802 so as to have converged or telescopingly collapsed the elements 803 and 801 of the coupling means 8.

It should also be noted that in setting the packer 9, the packer member 904 will have been rotated and moved downwardly relative to the member 903, as permitted by the configuration of the previously described conventional J-slot so as to allow the valving, sleeve-like element 904 to move downwardly and close the ports 905.

By reference to FIGURE 2, it will be appreciated that the elements of the apparatus are there arranged to allow well fluid to flow through the ports 906, into the passage means 6, and entirely through the tool to the interior of the conduit string supporting the apparatus. The closed ports 738 and 905 prevent fluids in the well annulus above the expanded packer 901 from communicating with or entering the passage means 6.

While the apparatus 1 is disposed as shown in FIGURE 2, the recorders 11 and 12 will continuously meter and record the pressure of fluids from a formation being tested, which formation is located beneath the expanded packer 901.

Figure 3:
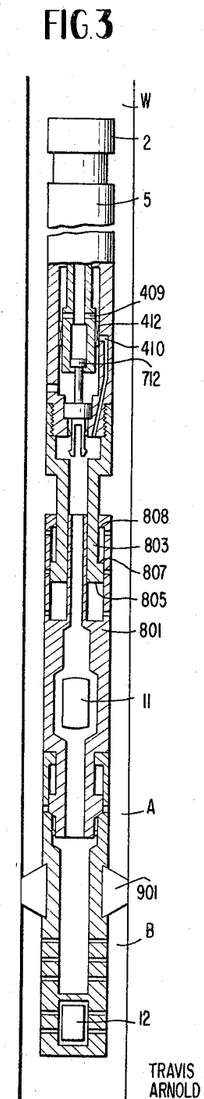
FIGURE 3 schematically illustrates the elements of the FIGURE 1 combination disposed so as to block the axial flow of well fluid through the apparatus so that the pressure of formation fluids under non-flowing conditions may be recorded.

FIGURE 3 illustrates an arrangement of apparatus components which results from the limited raising of the apparatus supporting conduit string. This limited raising closes the passage 3 and the passage means 6 by moving the ports 409 out of communicating alignment with the ports 410.

By merely exerting an upward force on the apparatus supporting conduit string, when the apparatus is disposed as shown in FIGURE 2, the stem 501 is raised so as to raise the valve stem 408 and close the passage 3.

When a lifting force is initially imposed on the conduit string sufficient to raise the stem 501, the stem 501 will move upwardly along with the valve stem 408 while the unitized housings 502 and 401 will remain stationary.

After the stem 501 has been raised to its uppermost position as determined by abutment means included in the mechanism 5, the valve stem 4 will have moved to a position to close the passage 3. (Such abutment means, although not shown in FIGURE 3, are fully illustrated and described in the previously noted Schwegman patent.) As will be appreciated, this valve closing occurs while the well fluid is flowing through the passage means 6. Thus, the closing of the valve, in response to the raising of the conduit string will trap well fluid sample in the passage means 6 beneath the valve 4.

After the valve stem 408 has been moved to its uppermost, closed position, continued upward movement of the conduit string 2 will serve to move the upper member 803 of the coupling means 8 upwardly through the cavity 802. Fluid pressure acting on an annular reaction surface 805 at the lower end of the member 803 will tend to raise the member 803 while this member 803 moves upwardly through the cavity 802. The pressure acting on the surface 805 is supplied by annulus fluids above the packer 9 which enter the chamber 803 through one or more radial ports 806 in the housing 801.

Figure 4:
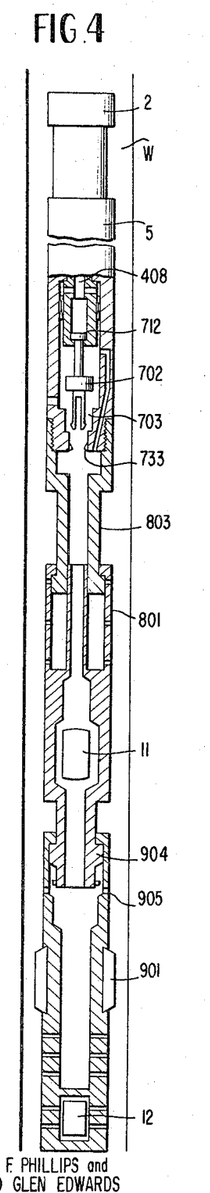
FIGURE 4 schematically illustrates the elements of the FIGURE 1 combination as they are disposed after the packer has been retracted and while the apparatus is being raised to a well head.

After the member 803 has been moved upwardly through its maximum axial travel, as determined by engagement of an abutment 807 carried by the member 803 with an abutment 808 carried by the housing 801, continued upward movement of the conduit string will then serve to pull the plug 702 out of the passage 703 so that the apparatus components assume the position shown in FIGURE 4.

The pulling of the plug 702 free of the passage 703 during the axial extension of the coupling 8 is prevented by the securing action of the abutment 718 in relation to the ring 733. As has been previously noted, an operator at a well head will be able to detect the substantial increase in lifting force required to pull the valving plug 702 free from its secured position within the passage 703.

With the apparatus components disposed as shown in FIGURE 4, i.e., with the valve 4 closed and the valve 7 open, the apparatus is in a condition to be disengaged from the well and raised to the well head. The opening of the valve 7 provides fluid communication above and below the packer so that the packer may be more easily released from the well wall.

By knowing the extent of axial travel of the element 803 relative to the element 801, an operator can limit the upward movement of the apparatus supporting string so as to terminate the lifting of the string while the elements of the coupling means 8 are disposed as shown in FIGURE 3, i.e., before the element 803 has reached its upper travel limit within the cavity 802. With the elements thus disposed, the valve plug 702 remains in a position closing the passage 703. Thus, if desired, without opening the ports 738, an operator may move the apparatus supporting conduit string up and down repeatedly. In this fashion, a sequence of pressure readings may be obtained by the recorders 11 and 12 which will reflect the extent to which pressure increases within the passage means 6 and well annulus beneath the packer 9 when flow through the apparatus is interrupted. This type of pressure recording may be repeated as often and as rapidly as desired by merely causing the apparatus supporting conduit string to undergo appropriate, limited axial movement.

After the desired readings have been obtained, the tool elements may be restored to the condition shown in FIGURE 4 (which is the same disposition of elements as that shown in FIGURE 1) and the apparatus 1 raised to the well head.

After the conduit string has been raised sufficiently to close the passage 3, extend the coupling means 8, and open the ports 738, the string may be additionally raised and manipulated so as to raise the member 904 and open the ports 905. Additional and well understood conventional manipulations of the apparatus supporting string may then be effected to cause the radial contraction of the well bore gripping and sealing elements of the packer assembly 9. With the packer assembly 9 thus freed from the engagement with the well, the entire apparatus may be drawn upwardly to the well head.

As the apparatus 1 is drawn upwardly through a well bore, annulus fluid may circulate through the ports 738, through the passage means 6, and the ports 905 and 906. This circulation through the tool may offset fluid resistance encountered during the raising operation and minimize the lifting force required to raise the tool to the well head.

It will be apparent that until the ports 738 are opened, the annular zone A within the well will be sealed by the sealing action of the packer 901 and the closed character of the ports 730. The term "sealing" as here used, of course, refers to the containing of fluid within the annulus A so as to prevent this fluid from flowing downwardly either through the apparatus 1 or past the packer 901.

At the well head the recorders 11 and 12 may be removed from the tool so that an evaluation may be made of the pressure recordings.

The apparatus 1 may be provided with conventional annular and elastomeric seals S and conventional vent ports P as schematically shown.

In general, unless otherwise indicated, the components of the apparatus illustrated in the appended drawings are generally cylindrical or tubular in character.

The generally utilized commercial embodiments of the elements of the apparatus would, for the most part, have circularly configured cross sectional configurations.

In order to describe the preferred embodiment of the apparatus without obscuring the inventive features, conventional structural details have been simplified. For example, those skilled in the oil tool art will recognize that many components of the apparatus have been shown as unitary components when in actual practice they would comprise a plurality of threadably or otherwise connected elements.

Principal advantages attributable to the invention relate to its structural ruggedness, its operational reliability, its ease of adaptability to existing structures such as those shown in the Schwegman patent, and in particular the improvement in control provided over the operation of independently movable valve components of the well tool.

The unique utilization of a sleeve type abutment mechanism to secure one valve, which in turn is manipulated by another, enables an operator at a well head to readily determine which valve is in which position during each phase of a well pressure recording operation. The novel structure of the sleeve securing mechanism, including a replaceable insert, enables operators to selectively adjust the force required to move the secured valve between open and closed positions.

The overall structure of the sleeve type securing mechanism contributes to structural ruggedness and dependability and minimizes the chances of failure or improper operation of the apparatus at remote locations within a well bore.

The unique neck-type connection between the two valves of the apparatus insures that the desired valve movements will result without depending upon the uncertainties of hydraulic pressure.

The unique combination of the extensible coupling, movement impeding device, and selectively releasable valve securing sleeve cooperate to enable apparatus valves to be sequentially and repeatedly manipulated, with each manipulation providing a signal at the well head indicating the position of the apparatus valves.

In describing the invention, reference has been made to a preferred embodiment. However, those skilled in the art will readily recognize that additions, deletions, substitutions or other modifications may be readily made with respect to this apparatus or its described mode of operation which would fall within the purview of the invention as defined in the appended claims.

We claim:

1. Apparatus for controlling fluid flow in a well tool, said apparatus comprising:
   body means;
   first valve means mounted for axial movement in said body means;
   second valve means mounted for axial movement in said body means;
   connecting means between said first and second valve means, said connecting means allowing limited axial movement of said first valve means relative to said second valve means in response to an axial force exerted thereon followed by concurrent axial movement of said first and second valve means in response to the continued application of axial force to said first valve means; and
   yieldable detent means releasably securing said second valve means to said body means.

2. Apparatus as described in claim 1 further including:
   passage means in said body means adapted to comunicate with well annulus fluids external of said body means when said apparatus is disposed in a well bore;
   cylinder means in said body means adapted to communicate with said passage means; and
   piston means carried by said second valve means for movement into and out of said cylinder means, said piston means and cylinder means being adapted to be in fluid communication with said passage means whereby said piston means, when disposed within said cylinder means, is exposed to the pressure of annulus fluids so as to be urged into said cylinder means.

3. An apparatus as described in claim 2:
   wherein said apparatus further includes fluid coupling means between said body means and said first valve means for hydraulically resisting movement of said first valve means for a selected portion of its movement; and
   wherein said yieldable detent means comprises:
      annular rim means carried by said body means, said rim means being coaxially aligned with said second valve means and disposed beneath said cylinder means when said apparatus is positioned within a well bore, and
      sleeve means carried by said second valve means and coaxially aligned with said rim means, said sleeve means including a plurality of circumferentially spaced and longitudinally extending slots so as to define a plurality of radially and resiliently deflectable web means,
      at least some of said web means each being provided with a radially outwardly projecting abutment engageable with the rim means of said body means.

4. An apparatus as described in claim 2:
   wherein said apparatus further includes fluid coupling means between said body means and said first valve means for hydraulically resisting movement of said first valve means for a selected portion of its movement; and wherein said yieldable detent means comprises:
   annular rim means carried by said body means, said rim means being coaxially aligned with said second valve means and disposed beneath said cylinder means when said apparatus is positioned within a well bore,
   sleeve means carried by said second valve means and coaxially aligned with said rim means, said sleeve means including a plurality of circumferentially spaced and longitudinally extending slots so as to define a plurality of radially and resiliently deflectable web means,
   each of said web means being provided with a radially outwardly projecting abutment engageable with the rim means of said body means,
   said abutments defining a generally annular and radially outwardly projecting abutment structure, and insert means telescopically received within said sleeve means, said insert means including a plurality of radially and resiliently deflectable fingers, each said finger being disposed to resiliently resist inward deflection of a radially outwardly adjacent web means of said sleeve means.

5. Apparatus for controlling fluid flow in a well tool, said apparatus comprising:
   body means;
   first valve means mounted for axial movement in said body means;
   second valve means mounted for axial movement in said body means;
   connecting means between said first and second valve means, said connecting means allowing limited axial movement of said first valve means relative to said second valve means in response to an axial force exerted thereon followed by concurrent axial movement of said first and second valve means in response to the continued application of axial force to said first valve means;
   said connecting means comprising:
      a neck projecting axially from said second valve means toward said first valve means,
      a first abutment carried by said neck,
      a second abutment carried by said first valve means between said first abutment and said second valve means,
      said second abutment being axially engageable with said first abutment when said first valve means has moved axially away from said releasably secured second valve means to a closed valve position;
   yieldable detent means releasably securing said second valve means to said body means;
   passage means in said body means adapted to communicate with well annulus fluids external of said body means when said apparatus is disposed in a well bore;
   cylinder means in said body means adapted to communicate with said passage means;
   piston means carried by said second valve means for movement into and out of said cylinder means, said piston means being adapted to be in fluid communication with said passage means whereby said piston means, when disposed within said cylinder means, is exposed to the pressure of annulus fluids so as to be urged into said cylinder means;
   fluid coupling means between said body means and said first valve means for hydraulically resisting movement of said first valve means for a selected portion of its movement;
   yieldable detent means releasably securing said second valve means to said body means and comprising:
      annular rim means carried by said body means, coaxially aligned with said second valve means, and disposed beneath said cylinder means when said apparatus is positioned within a well bore,
      sleeve means carried by said second valve means and coaxially aligned with said rim means, said sleeve means including a plurality of circumferentially spaced and longitudinally extending slots so as to define a plurality of radially and resiliently deflectable web means,
      each of said web means being provided with a radially outwardly projecting abutment engageable with the rim means of said body means,
      said abutments defining a substantially annular and radially outwardly projecting abutment structure, and
      insert means telescopingly received within said sleeve means, said insert means including a plurality of radially and resiliently deflectable fingers, each said finger being disposed to resiliently resist inward deflection of a radially outwardly adjacent web means of said sleeve means;
   packer means for engaging a well bore and adapted to be disposed beneath said body means; and
   extension joint means disposed between said body means and said packer means.

6. Apparatus for use in a well tool, said apparatus comprising:
   body means;
   a member mounted for axial movement in said body means;
   yieldable detent means releasably securing said member to said body means and including:
      annular rim means carried by said body means and coaxially aligned with said member,
      sleeve means carried by said member and coaxially aligned with said rim means, said sleeve means including a plurality of circumferentially spaced and longitudinally extending slots so as to define a plurality of radially and resiliently deflectable web means,
      each of said web means being provided with a radially outwardly projecting abutment engageable with the rim means of said body means,
      said abutments defining a substantially annular and radially outwardly projecting abutment structure, and
      insert means telescopingly received within said sleeve means, said insert means including a plurality of radially and resiliently deflectable fingers, each said finger being disposed to resiliently resist inward deflection of a radially outwardly adjacent web means of said sleeve means.

7. Apparatus for controlling fluid flow in a well tool, said apparatus comprising:
   body means;
   valve operating means mounted for axial movement in said body means;
   hydraulic coupling means adapted to impede an initial portion of the axial movement of said valve operating means while allowing relatively unimpeded movement of said valve operating means during a terminal portion of its movement;
   valve means mounted for axial movement in said body means;
   connecting means between said valve operating means and said valve means, said connecting means allowing limited axial movement of said valve operating means relative to said valve means in response to an axial force exerted thereon followed by concurrent axial movement of said valve operating means and valve means in response to the continued application of axial force to said valve operating means; and
   yieldable detent means releasably securing said valve means to said body means; with said valve means being releasable and connectable with said detent means in response to said terminal movement of said valve operating means.

References Cited

UNITED STATES PATENTS

| | | | |
|---|---|---|---|
| Re. 24,352 | 8/1957 | Comstock | 166—145 |
| 620,973 | 3/1899 | Rühl | 137—630.22 X |
| 2,064,429 | 12/1936 | Hudson | 166—188 |
| 2,740,479 | 3/1956 | Schwegman | 166—145 |
| 2,745,627 | 5/1956 | Winfree | 251—297 X |
| 2,806,539 | 9/1957 | Green et al. | 166—188 X |
| 3,037,797 | 6/1962 | Brown. | |
| 3,109,490 | 11/1963 | Baker | 166—114 |
| 3,190,360 | 6/1965 | Farley | 166—152 X |
| 3,305,023 | 2/1967 | Farley | 166—226 |
| 3,306,363 | 2/1967 | McZilkey | 166—152 |

CHARLES E. O'CONNELL, *Primary Examiner.*

I. A. CALVERT, *Assistant Examiner.*